United States Patent [19]

Frierdich

[11] Patent Number: 4,769,611
[45] Date of Patent: Sep. 6, 1988

[54] FREQUENCY SENSING CIRCUITS AND METHODS

[75] Inventor: Waldo J. Frierdich, Highland, Ill.

[73] Assignee: Basler Electric Company, Highland, Ill.

[21] Appl. No.: 802,712

[22] Filed: Nov. 27, 1985

[51] Int. Cl.[4] .......................... H03K 5/00; H03K 9/06
[52] U.S. Cl. .................................... 328/140; 328/134; 307/519; 307/234
[58] Field of Search ............... 307/519, 525, 526, 234, 307/261, 354, 522; 328/134, 141, 140, 111, 109

[56] References Cited

U.S. PATENT DOCUMENTS

| | | | |
|---|---|---|---|
| 3,350,580 | 10/1967 | Harrison | 307/608 |
| 3,529,215 | 9/1970 | Xavier et al. | 317/147 |
| 3,535,591 | 10/1970 | Holmquest | 317/27 |
| 3,564,275 | 2/1971 | Eberle | 307/29 |
| 3,601,707 | 8/1971 | Bauer | 307/519 |
| 3,984,755 | 10/1976 | Lehnhoff et al. | 322/28 |
| 3,990,007 | 11/1976 | Hohhof | 324/780 |
| 4,090,090 | 5/1978 | Johnston | 307/87 |
| 4,096,395 | 6/1978 | Bogel et al. | 307/64 |
| 4,219,769 | 8/1980 | Macfarlane et al. | 322/28 |
| 4,231,029 | 10/1980 | Johnston | 340/658 |
| 4,533,863 | 8/1985 | Luhn et al. | 322/28 |

OTHER PUBLICATIONS

"Voltage Regulator Rated 3.5 Amp", Diesel Progress North American, p. 18, undated.

Primary Examiner—Stanley D. Miller
Assistant Examiner—Timothy P. Callahan
Attorney, Agent, or Firm—Senniger, Powers, Leavitt and Roedel

[57] ABSTRACT

Circuitry for sensing frequency over time of a signal that has zero crossings. A first circuit commences generation of a periodic waveform in response to at least some of the zero crossings. A bistable circuit connected to the waveform commencing circuit produces a first electrical level in response to a zero crossing and, upon the occurrence of a predetermined change in the waveform, produces a second electrical level until a subsequent zero crossing occurs. A third circuit low-pass filters the electrical levels from the bistable circuit to produce an output which is a function of the frequency of the signal. Methods for sensing frequency over time of a signal that has zero crossings are also disclosed.

20 Claims, 2 Drawing Sheets

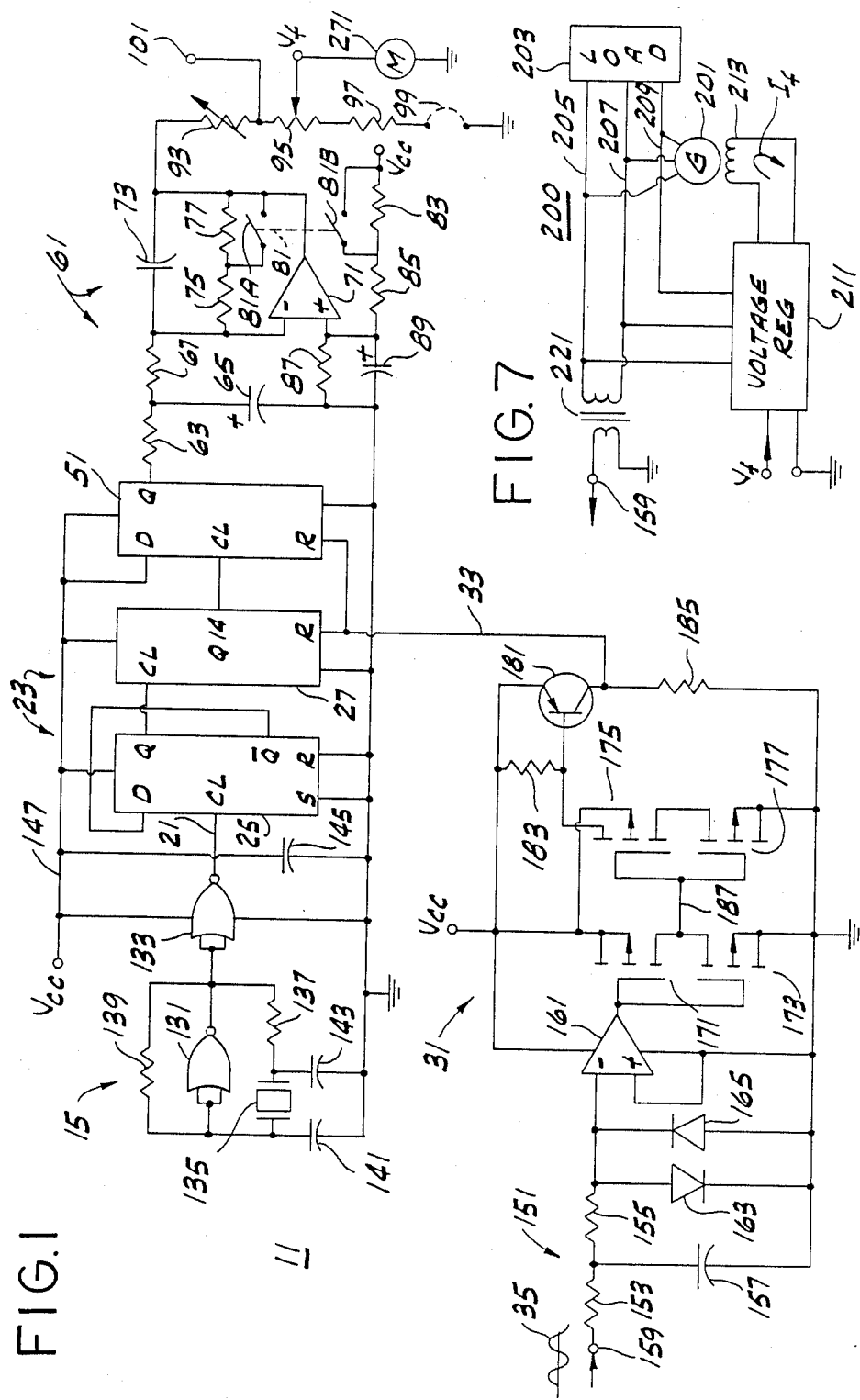

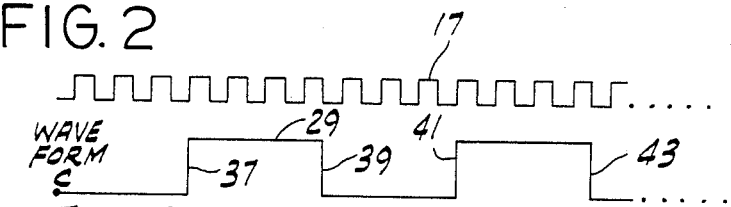
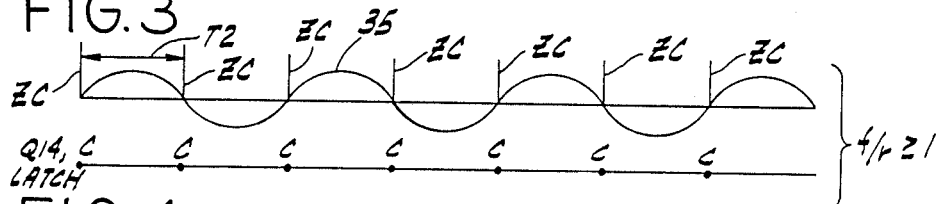
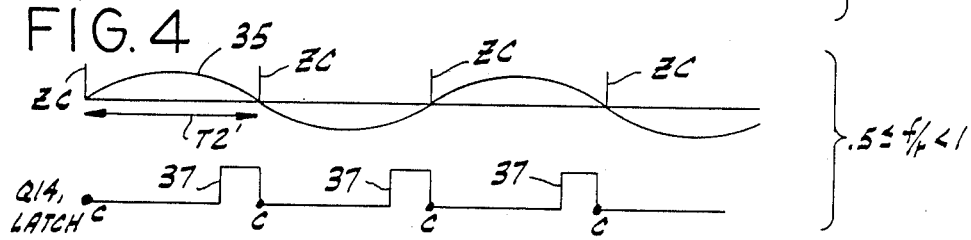
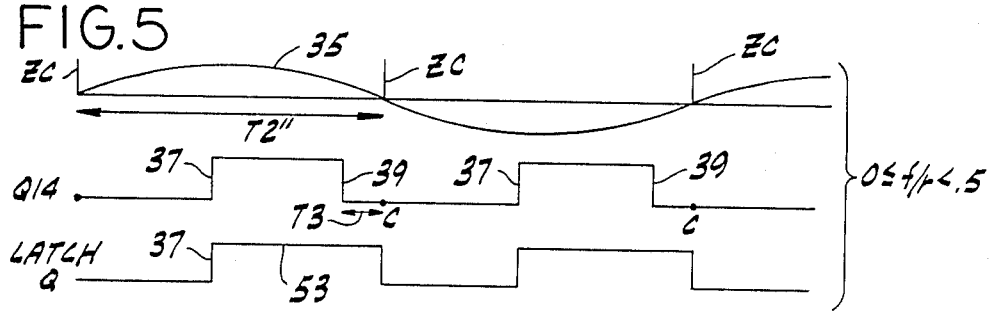
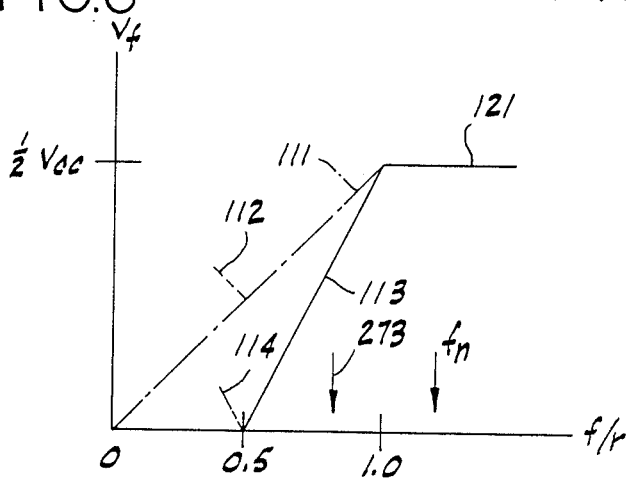
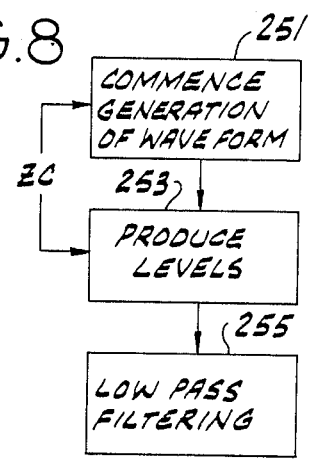

FREQUENCY SENSING CIRCUITS AND METHODS

BACKGROUND OF THE INVENTION

The present invention relates to circuits and methods for frequency sensing. More specifically, the present invention relates to circuitry and methods for producing an electrical output which is a function of the frequency of a signal that has zero crossings. Without limiting the scope of applications contemplated for the invention, its background is described in connection with the field of electrical generator voltage regulation.

A generator of electrical power such as an alternator or rotary exciter typically has a field winding the direct current (DC) energization of which sets up a magnetic field in the generator and thereby controls the voltage of its alternating current (AC) output. A prime mover turns a rotor of the generator, and mechanical energy is converted into electrical energy for electrical power lines to a load in a conventional manner. The rotor speed (rpm) of the generator determines the AC frequency of its output. The AC output voltage is regulated by a voltage regulator such as a shunt static exciter (SSE) which senses the generator AC voltage and varies the DC current in the generator field winding to maintain the generator voltage level.

Motors and transformers that constitute the generator load have impedances that decrease with frequency and the resultant increase in current may damage these load components if the generator voltage is not reduced at lower frequencies. Thus, it is desirable that the generator output voltage not be held constant when generator rpm and frequency are reduced significantly. Therefore, some voltage regulators have an underfrequency rolloff circuit that senses the generator frequency and causes the generator voltage to be reduced at the lower frequencies.

Because of the importance of frequency sensing to generator voltage regulation and relaying in the electrical power field, new and improved types of frequency sensing circuits and methods with potential economic and performance advantages are of considerable interest. Also, there is a need for improved frequency sensing circuits with output characteristics that are relatively insensitive to temperature variations. In applications involving two or more generators operated in parallel, an economical type of frequency sensing circuit is needed to make the voltage-to-frequency characteristics of all the regulators for the generators exactly the same. Generally, there has been a lack of standardization of circuits to provide well-defined volts-per-Hertz performance and there is a need for a circuit which effects such standardization. There is also a need for circuits in which the volts-per-Hertz performance may be selectively adjusted without significantly increasing the complexity of the circuitry.

SUMMARY OF THE INVENTION

Among the objects of the present invention are to provide improved apparatus and methods for sensing frequency over a wide range of frequencies of a signal; to provide improved apparatus and methods for producing an output which is a precisely linear function of frequency over a wide range of frequencies; to provide improved apparatus and methods for producing an analog output which is constant above a rolloff frequency and varies smoothly with frequency over a wide range of frequencies below the roll-off frequency; to provide improved apparatus and methods for producing an analog output which is constant above a rolloff frequency and decreases linearly with frequency below the rolloff frequency all the way to zero frequency; to provide improved apparatus and methods for producing an analog output which is constant above a rolloff frequency and below a selectable lower limit frequency and varies smoothly with frequency in the range of frequencies between the rolloff frequency and the lower limit frequency; to provide improved apparatus and methods for producing an output which can be used as an electrical reference for voltage regulation purposes in a system for voltage regulating one or more generators which are to have a frequency-dependent AC output; to provide improved apparatus and methods for generating an electrical reference for a voltage regulator so that the reference voltage has a voltage to frequency characteristic that is relatively unaffected by typical manufacturing variations and by temperature changes; and to provide improved apparatus and methods for sensing frequency which are simple, reliable and economical to implement.

Other objects and features will be in part apparent and in part pointed out hereinafter.

Generally, and in one form of the invention for sensing frequency over time of a signal that has zero crossings, a first circuit commences generation of a periodic waveform in response to at least some of the zero crossings. A bistable circuit connected to the waveform commencing circuit produces a first electrical level in response to a zero crossing and, upon the occurrence of a predetermined change in the waveform, produces a second electrical level until a subsequent zero crossing occurs. A third circuit low-pass filters the electrical levels from the bistable circuit to produce an output which is a function of the frequency of the signal.

In general, a method form of the invention for sensing frequency over time of a signal that has zero crossings, includes the steps of commencing generation of a periodic waveform in response to at least some of the zero crossings, producing a first electrical level in response to a zero crossing and, upon the occurrence of a predetermined change in the waveform, producing a second electrical level until a subsequent zero crossing occurs, and low-pass filtering the electrical levels to produce an output which is a function of the frequency of the signal.

BRIEF DESCRIPTION OF THE DRAWINGS

FIG. 1 is a schematic diagram of a frequency sensing circuit of the present invention;

FIG. 2 is a waveform diagram of clock pulses and a periodic waveform of frequency divided clock pulses in the circuit of FIG. 1, the time scale of the clock pulses being magnified relative to the time scale of the frequency divided clock pulses;

FIG. 3 is a waveform diagram of a signal having a frequency to be sensed, showing zero crossing pulses produced by the circuit of FIG. 1 above a corresponding diagram of an electrical level produced by the circuit of FIG. 1;

FIG. 4 is a waveform diagram of a signal and zero crossing pulses of lower frequency than in FIG. 3, and shown above a corresponding diagram of two electrical levels produced by the circuit of FIG. 1 when the lower frequency occurs;

FIG. 5 is a waveform diagram of a signal and zero crossing pulses of still lower frequency than in FIG. 4, and shown above two corresponding diagrams of electrical levels produced at different places in the circuit of FIG. 1 at the still lower frequency;

FIG. 6 is a diagram of two selectable voltage outputs of the circuit of FIG. 1 versus a ratio of signal frequency to a rolloff frequency r;

FIG. 7 is a diagram of a system for voltage regulating a generator having an AC output which is to be frequency-dependent; and FIG. 8 is a diagram of steps in a method of the invention.

Corresponding reference characters indicate corresponding parts throughout the several views of the drawings.

DESCRIPTION OF THE PREFERRED EMBODIMENTS

In FIG. 1 frequency sensing circuit 11 has an oscillator 15 that produces clock pulses 17 of FIG. 2 at 1.835 MHz. on a line 21 connected to a frequency dividing circuit 23. Frequency dividing circuit 23 is composed of a D flip-flop 25 connected for divide-by-2 operation driving a 14-stage RCA CD4020A frequency divider chip 27. Frequency dividing circuit 23 thus has a value of frequency division of $2^{15}$ or 32768.

If the circuit 23 is allowed to operate freely, a square-wave periodic waveform 29 of FIG. 2 at a frequency of 56 Hz. (1,835,000 divided by 32768) is generated at a Q14 output of frequency divider chip 27. However, a zero crossing detector 31 supplies spike shaped pulses ZC of FIG. 3 on a reset line 33. Pulses ZC are coincident with each of the zero crossings of a signal 35 the frequency of which is to be sensed. These pulses ZC restart the waveform 29 at the point marked C in FIG. 2. Therefore, the actual voltage behavior at output Q14 depends on when the pulses ZC occur relative to changes such as transitions 37, 39, 41 and 43 in waveform 29. Thus, oscillator 15 and frequency dividing circuit 23 together constitute means for commencing or initiating generation of a periodic waveform (e.g. waveform 29) in response to at least some of the zero crossings.

The frequency of the periodic waveform 29 is independent of the frequency of signal 35 and is called the rolloff frequency r herein. It is to be understood that in various embodiments the rolloff frequency is selected to be whatever value is desired for the purposes at hand, such as by changing the frequency of the oscillator 15 or the value of frequency division of frequency dividing circuit 23. If it is desired to keep rolloff frequency constant and use twice the oscillator frequency, then an extra stage of frequency division is added. Conversely, the oscillator frequency can be lowered, and stages of frequency division omitted without changing the rolloff frequency. Oscillator 15 is very stable and the rolloff frequency is readily duplicated from unit to unit of circuit 11 in manufacture. In an embodiment such as that of FIG. 1 where the oscillator 15 is not itself reset, it is preferable that the frequency division circuit 23 have a value of frequency division of at least 256 since the oscillator output on line 21 is not synchronous with reset.

A relationship of the occurrence of the zero crossings to the changes in waveform 29 in determining the voltage behavior at output Q14 is expressed by the ratio f/r of the frequency f of the signal 35 to the rolloff frequency r.

FIGS. 3, 4 and 5 show three examples of the behavior of the Q14 voltage for different frequency ratios f/r. For example, when signal 35 has a nominal AC system frequency of 60 Hz., and the rolloff frequency is 56 Hz. the ratio f/r exceeds unity as illustrated in FIG. 3. Each zero crossing pulse ZC resets frequency divider chip 27 making the voltage at Q14 go low. A transition 37 from low to high cannot occur until a time period $TL=1/(2r)$ has elapsed after an instant C when the waveform commenced. The time period TL is half the repetition period of waveform 29 where the repetition period is the reciprocal of rolloff frequency r. Since the signal frequency f is greater than the rolloff frequency r in FIG. 3, the frequency divider chip 27 is reset upon completion of a shorter time period $T2=1/(2f)$.

The actual voltage at Q14 as shown in FIG. 3 is therefore a continuous low formed of a succession of initial low segments of waveform 29 commencing with point C and lasting for the time period T2. In this way, circuit 11 has means for generating pulses (e.g. on line 21) with a repetition rate selected so that the output of the frequency dividing means is an unvarying voltage during the time between successive zero crossings at the nominal frequency.

FIG. 4 shows an example when the signal frequency f is less than the rolloff frequency r but exceeds half the rolloff frequency. As in FIG. 3 each zero crossing ZC resets frequency divider chip 27 making the voltage at Q14 go low at each instant C. Transition 37 from low to high now occurs before reset and upon the time period $$TL=1/(2r) \qquad (1)$$

elapsing after each instant C. Since the signal frequency f is now less than the rolloff frequency r in FIG. 4, the frequency divider chip 27 is only reset upon completion of a longer time period $$T2'=1/(2f) \qquad (2)$$

The actual voltage at Q14 as shown in FIG. 4 is therefore a low commencing with point C and lasting for the time period TL followed by a high portion of waveform 29 which is only permitted to last for a time $TH=T2'-TL$ before reset occurs.

The proportion of time X during which the Q14 voltage is low in FIG. 4 is given by the equation $$X=TL/T2'=TL/(TL+TH) \qquad (3)$$

Remarkably, substitution of the defining equations (1) and (2) into Equation (3) shows that $$X=f/r \qquad (4)$$

In other words, the time proportion X is the same as the frequency ratio itself. When the rolloff frequency is constant, as in the circuit of FIG. 1, the time proportion X is a linear function of signal frequency f in FIG. 4 when f is between half the rolloff frequency and 100% of the rolloff frequency. When frequency f exceeds the rolloff frequency r, as in FIG. 3, the time proportion is always unity.

It is observed that the advantageously linear relationship of Equation (4) does not hold for the output Q14 as frequency falls below half the rolloff frequency 0.5r, as illustrated in FIG. 5. FIG. 5 shows an example when the signal frequency f is less than half the rolloff frequency, which means that a reset interval T2" is lengthened beyond a full cycle of periodic waveform 29. This is because the Q14 voltage goes back low after transition 39 due to normal flip-flop action in the frequency divider chip 27. This would prevent the characteristic below half the rolloff frequency from being a linear extension of the characteristic above half the rolloff frequency. As in FIG. 3 each zero crossing ZC resets frequency divider chip 27 making the voltage at Q14 go low. The actual voltage at Q14 as shown in FIG. 5 is a low commencing with point C and lasting for the time period TL followed by transition 37 to the high portion of waveform 29 which is completed at transition 39 and followed by a low for a time $T3 = (T2'' - 1/r)$ before reset occurs.

To solve the problem of obtaining the linear relationship of Equation (4) at all frequencies below the rolloff frequency, a latch or D flip-flop 51 of FIG. 1 is provided with its clock input CL connected to output Q14 and its D input tied high to $V_{cc}$. Latch 51 produces a low in response to a zero crossing ZC pulse high because its reset pin R is connected to line 33. Upon the occurrence of low-to-high transition 37 in periodic waveform 29, latch 51 produces a Q output high 53 (FIG. 5) by latching a high from its D input to its Q output until the next zero crossing occurs. In this way, latch 51 constitutes bistable means connected to said waveform commencing means (e.g., oscillator 15 and frequency dividing circuit 23) for producing a first electrical level in response to a zero crossing and, upon the occurrence of a predetermined change in the waveform, producing a second electrical level until a subsequent zero crossing occurs. As a result, Equation (4) validly describes the output behavior at the Q output of latch 51 at all frequencies below the rolloff frequency because the time proportion X of latch 51 Q output low to reset time T2" is $(1/(2r))/(1/(2f))$ or just $f/r$.

In FIG. 1 a low pass filter 61 low pass filters (effectively time-averages) the electrical levels from the latch 51 Q output to produce an output $V_f$ which is a linear function of the frequency of the signal 35. A resistor 63 is connected at one end to the Q output of latch 51 and at the other end to a capacitor 65 and another resistor 67. Capacitor 65 is connected between ground (common) and the junction of resistors 63 and 67. Resistor 67 is connected between capacitor 65 and the inverting (−) input of an operational amplifier 71. A capacitor 73 is connected between the output of amplifier 71 and its inverting input. Two resistors 75 and 77 are connected in series across capacitor 73. Capacitors 65 and 73 are of course subject to manufacturing and temperature variations but these are not critical in the low pass filter 61 and hardly affect the precise characteristics of circuit 11.

A section 81A of a shorting switch 81 is connected across resistor 77 and switch 81 has another section 81B. Two resistors 83 and 85 are connected in series between voltage $V_{cc}$ and the noninverting (+) input of amplifier 71. Switch section 81B is connected across resistor 83. Another resistor 87 and a bypass capacitor 89 are connected in parallel between the noninverting (+) input of amplifier 71 and ground. Resistor 83 (when used), and resistors 85 and 87 form a voltage divider for providing a selectable DC voltage to the noninverting input of amplifier 71. In this way amplifier 71 acts as part of the low pass filter 61 and as means for subtracting the low-pass filtered electrical levels from a predetermined voltage.

Latch 51 also constitutes means for causing the output (e.g., $V_f$ of circuit 11) for frequencies of the signal below half the waveform frequency to be different in value from the output for frequencies of the signal above half the waveform frequency. Latch 51 is also an example of means for preventing the output of the low-pass filtering means at any frequency below half the rolloff frequency from being equal in value to the output at any frequency above half the rolloff frequency. Moreover, latch 51 is an example of means for maintaining linearity of the output of said low-pass filtering means as a function of frequency below half the rolloff frequency.

A variable resistor 93, potentiometer 95, resistor 97 and a jumper 99 are all connected in series between the output of amplifier 71 and ground. A test point 101 is connected to the junction between the variable resistor 93 and potentiometer 95. The output $V_f$ of the frequency sensing circuit 11 is taken from the wiper of potentiometer 95. Jumper 99 is ordinarily left on, but a resistor for trimming the charcteristics of potentiometer 95 is substituted for jumper 99 if desired.

The supply voltage is $V_{cc}$, and the average voltage at the latch 51 Q output is $(1-X)V_{cc}$ where $(1-X)$ is the duty cycle, or proportion of time that the Q output is high. The average of the Q14 output is recovered by low pass filtering it with filter 61. Then the averaged output is processed to yield an output of amplifier 71 with a particular volts-per-Hertz slope.

The slope S in (per-unit) volts-per-Hertz is given by $$S = 1/(1 - f_1/r) \qquad (5)$$

r is the rolloff frequency at which the output voltage of amplifier 71 one per-unit volts, and one-per-unit volts is arbitrarily taken to be half of $V_{cc}$ in circuit 11. $f_1$ is a lower limit frequency at which the output voltage of amplifer 71 is zero.

In FIG. 6, volts-per-Hertz characteristics 111 and 113 are shown for 1 volt-per-Hertz and for 2 volts-per-Hertz respectively. Above the rolloff frequency (above $f/r = 1$) the output $V_f$ is at half of $V_{cc}$. Below the lower limit frequency (zero Hertz for characteristic 111, and half-rolloff for characteristic 113), the output $V_f$ is zero volts. Since the output of amplifier 71 cannot go below zero volts, it remains constant at frequencies below the lower limit frequency due to the action of latch 51. Between the rolloff frequency and the lower limit frequency, each characteristic advantageously decreases with precise linearity as a function of frequency. Because of latch 51, the characteristics do not follow lines of departure 112 and 114 as would occur if output Q14 were connected directly to low pass filter 61 in FIG. 1.

The resistances of resistors 63, 67, 75 and 77 are all made equal to each other. The resistances of resistors 83 and 87 are made equal to each other and the resistance of resistor 85 is twice the resistance of resistor 87. Then when switch sections 81A and 81B are open, the 2 volts-per-Hertz characteristic 113 is obtained. When switch sections 81A and 81B are closed, the 1 volt-per-Hertz characteristic 111 is obtained. Thus switch 81 constitutes means for selecting a volts per Hertz slope of the output of the low-pass filtering means relative to the frequency of the signal. Alternatively, resistors 77 and 83 can be made ganged variable resistors and the switch 81 omitted.

When several frequency sensing circuits 11 are used variable resistor 93 in each of the circuits 11 is adjusted until the voltage at test point 101 is exactly the same in each of the circuits 11, or in voltage regulator applications until equal generator voltages are produced. Potentiometer 95 in each frequency sensing circuit is ganged with the corresponding potentiometer 95 in the other circuits 11. Then the voltage output $V_f$ from the wiper of potentiometer 95 tracks in all of the units. The wiper of potentiometer 95 is adjusted to provide a desired level of voltage output 121 (FIG. 6) at and above the rolloff frequency.

The construction and operation of circuit 11 of FIG. 1 is now further discussed. Oscillator 15 has an inverter 131, the output of which is connected to the input of a second inverter 133. The output of inverter 133 is connected to line 21 to the clock input of flip-flop 25. A 1.835 MHz. quartz crystal is connected in series with a resistor 137 between the input and the output of inverter 131. (A circuit with a ceramic resonator can also be used to obtain a high degree of frequency stability.) A resistor 139 is also connected between the input and the output of inverter 131. Two capacitors 141 and 143 are respectively connected from each terminal of crystal 135 to ground. A capacitor 145 is connected between $V_{cc}$ and ground to prevent transients and ripple on the supply voltage $V_{cc}$ line 147. D flip-flop 25 has its set and reset inputs S and R tied to ground and its Q-bar output connected to its D input. The Q output of D flip-flop 25 is connected to the clock CL input of frequency divider chip 27.

In zero crossing detector 31, signal 35 is coupled through a low pass filter 151 composed of two resistors 153 and 155 and a capacitor 157. Resistors 153 and 155 are connected in series between an input terminal 159 for signal 35 and an inverting (−) input of an operational amplifier 161. The noninverting (+) input of amplifier 161 is connected to ground. Two diodes 163 and 165 are connected in parallel and with polarities reversed across the inputs of amplifier 161. In this way, the output of amplifier is a square wave that is high when signal 35 is negative and low when signal 35 is positive.

The output of amplifier 161 is connected to the gate of each of two field effect transistors (FETs) 171 and 173 on a CD4007A COS MOS chip that also has two more FETs 175 and 177. FETs 171 and 175 are p type and FETs 173 and 177 are n type enhancement FETs. The source and substrate of FET 171 are connected with the substrate of FET 175 to supply voltage $V_{cc}$. The sources and substrates of FETs 173 and 177 are connected together and to ground. The drains of FETs 171 and 173 are connected together and to each gate of FETs 175 and 177. The drains of FETs 175 and 177 are connected to each other.

A PNP transistor 181 has its emitter connected to $V_{cc}$, its base connected to the source of FET 175, and collector connected to reset line 33. A resistor 183 is connected between the emitter and base of transistor 181, and a resistor 185 is connected between the collector of transistor 181 and ground. FETs 171 and 173 acting together produce an output on a line 187 which is a new square wave that has a rise and fall time hundreds of times faster than that generated by amplifier 161. This improved square wave is in turn supplied to the gates of FETs 175 and 177 which have an advantageous feature such that during the rise and fall times of the input to their gates, a substantial "fire through" current flows through them between $V_{cc}$ and ground (common) for a few microseconds. Since the source of the FET 175 is connected to the base of transistor 181, the fire through current momentarily causes conduction by transistor 181 and generates a very sharp pulse across resistor 185 which is ideal for resetting frequency divider chip 27 and latch 51.

In FIG. 7 an electrical power generating system 200 includes a generator 201 for supplying a three-phase AC output voltage to a load 203 having transformers and motors on a set of lines 205, 207, and 209. The voltages between the lines or phases are approximately equal in magnitude and 120° out of phase at a nominal system frequency of 60 Hertz. For the present purposes the root-mean-square (r.m.s.) value of line-to-line voltage is regarded as representative of the AC output voltage of generator.

The frequency sensing circuit 11 acts as an underfrequency rolloff circuit supplying a reference voltage $V_f$ to a voltage regulator 211. Regulator 211 is connected to the lines 205, 207 and 209 to obtain operating power and also to sense the voltage therefrom. Regulator 211 provides a DC current $I_f$ to a field winding 213 of generator 201, and regulates the generator output voltage using voltage $V_f$ from circuit 11 as a reference. The circuitry of regulator 211 includes an error detector for comparing the reference voltage $V_f$ with the sensed voltage from the generator 201, an error amplifier, a power controller and a stabilization network. A variable regulating voltage produced by the power controller is typically a series of pulses which are varied in width to adjust the DC field current.

In FIG. 7 a potential transformer 221 is connected between two of the lines 205 and 207 and has a secondary winding connected between input terminal 159 of circuit 11 and ground. A rolloff frequency (e.g. 56 Hz.) is established in circuit 11 of FIG. 1 slightly below a nominal system frequency $f_n$ of 60 Hz., see FIG. 6. Below the rolloff frequency, the reference voltage $V_f$ decreases linearly at a volts-per-Hertz rate selected by switch 81.

A method of operation of the circuit 11 of FIG. 1 is diagrammed in FIG. 8. A first method step 251 is an operation of commencing generation of periodic waveform 29 of FIG. 2 in response to at least some of the zero crossings of signal 35. A next method step 253 is an operation of producing a first electrical level in response to a zero crossing and, upon the occurrence of a predetermined change in the waveform, producing a second electrical level until a subsequent zero crossing occurs. A final step 255 is an operation of low-pass filtering the electrical levels to produce an output which is a function of the frequency of the signal.

In some embodiments of the invention it is contemplated that the frequency sensing circuit 11 of FIG. 1 is used as a frequency measuring instrument by connecting a voltmeter 271 to the voltage $V_f$. The rolloff frequency of circuit 11 is established above a frequency of the signal 35 to be measured so that its f/r ratio 273 lies below 1.0 in FIG. 6 and in the linear range of the instrument. It is to be understood that in some embodiments the rolloff frequency will not be anywhere near 60 Hertz. and that the rolloff frequency can be made variable for various purposes.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A circuit for sensing frequency over time of an input signal that has a frequency and zero crossing, comprising:
    means for commencing generation of a periodic waveform in response to a zero crossing and restarting generation of the periodic waveform in response to a subsequent zero crossing, the generation of the periodic waveform continuing freely until each restarting occurs;
    bistable means connected to said waveform commencing means for producing a first electrical level in response to a zero crossing and, upon the occurrence of a predetermined change in the waveform, producing a second electrical level until a subsequent zero crossing occurs; and
    means for low-pass filtering the electrical levels from said bistable means to produce an output which is a function of the frequency of the input signal.

2. A frequency sensing circuit as set forth in claim 1 wherein the periodic waveform has a frequency independent of the frequency of the input signal and said bistable means comprises means for causing the output for frequencies of the input signal less than half the frequency of the waveform to be different in value from the output for frequencies of the input signal greater than half the frequency of the waveform.

3. A frequency sensing circuit as set forth in claim 1 wherein said waveform commencing means includes means for generating pulses and means for frequency dividing the pulses which frequency dividing means is resettable in response to the zero crossings to commence the waveform.

4. A frequency sensing circuit as set forth in claim 3 wherein said pulses have a repetition frequency and said frequency sensing circuit has a rolloff frequency which is substantially equal to the repetition frequency divided by a value of frequency division of said frequency dividing means, and said bistable means comprises means for preventing the output of the low-pass filtering means corresponding to any frequency of the input signal less than half the rolloff frequency from being equal in value to the output of the low-pass filtering means corresponding to any frequency of the input signal greater than half the rolloff frequency.

5. A frequency sensing circuit as set forth in claim 3 further comprising means for supplying a pulse coincident with each of the zero crossing to reset said frequency dividing means and said bistable means.

6. A frequency sensing circuit as set forth in claim 3 wherein the input signal has a nominal frequency and said means for generating pulses has a repetition frequency selected so that the output of the frequency dividing means is an unvarying voltage during the time between the successive zero crossings at the nominal frequency.

7. A frequency sensing circuit as set forth in claim 3 wherein the input signal has a nominal frequency and said means for generating pulses has a repetition frequency selected so that the output of the frequency dividing means is an unvarying voltage during the time between successive zero crossings at the nominal frequency, and so that when the frequency of the input signal is less than a predetermined rolloff frequency that is less than the nominal frequency the waveform makes a transition which is a predetermined change before said frequency dividing means is reset in response to a subsequent zero crossing.

8. A frequency sensing circuit as set forth in claim 7 wherein the rolloff frequency is substantially equal to the repetition frequency of the means for generating pulses divided by a value of frequency division of the frequency dividing means.

9. A frequency sensing circuit as set forth in claim 3 wherein the frequency dividing means has a value of frequency division of at least 256.

10. A frequency sensing circuit as set forth in claim 3 wherein said means for generating pulses has a repetition frequency and said frequency sensing circuit has a rolloff frequency which is substantially equal to the repetition frequency divided by a value of frequency division of the frequency dividing means, the output of said low-pass filtering means being a substantially linear function of frequency when the frequency of the input signal is less than the rolloff frequency, said bistable means comprising means for maintaining linearity of the output of said low-pass filtering means as a function of frequency when the frequency of the input signal is less than half the rolloff frequency.

11. A frequency sensing circuit as set forth in claim 1 wherein said bistable means includes means for producing the first electrical level in response to each zero crossing and, upon the occurrence of a transition in the waveform, producing the second electrical level until the next zero crossing occurs.

12. A frequency sensing circuit as set forth in claim 1 wherein said low-pass filtering means includes means for subtracting the low-pass filtered electrical levels from a predetermined voltage to produce the output.

13. A frequency sensing circuit as set forth in claim 1 further comprising means for selecting a volts per Hertz slope of the output of said low-pass filtering means relative to the frequency of the input signal.

14. A frequency sensing circuit as set forth in claim 1 further comprising means for supplying a pulse coincident with each of the zero crossings to reset said waveform commencing means and said bistable means.

15. A frequency sensing circuit as set forth in claim 1 wherein the input signal has a nominal frequency and said waveform commencing means includes means for generating pulses and resettable means for frequency dividing the pulses which frequency dividing means has a frequency division value of at least 256, and the circuit further comprises means for supplying a pulse coincident with each of the zero crossings to reset said frequency dividing means and said bistable means, said pulses having a repetition frequency selected so that the output of the frequency dividing means is an unvarying voltage during the time between successive zero crossings at the nominal frequency, and so that when the frequency of the input signal is less than a predetermined rolloff frequency that is lower than the nominal frequency the waveform makes a transition in voltage level before said frequency dividing means is reset in response to a subsequent zero crossing, the rolloff frequency being substantially equal to the repetition frequency of the pulses divided by the value of frequency division of the frequency dividing means, the proportion of time during which the bistable means is producing the first level thereby decreasing linearly with frequency when the frequency of the input signal is less than the rolloff frequency.

16. A frequency sensing circuit for use in a system for voltage regulating a generator having an AC output with zero crossings, which AC output is to be frequency-dependent, the circuit comprising:
  means for commencing generation of a periodic waveform including means for generating first pulses and resettable means for frequency dividing the first pulses;
  means for supplying second pulses coincident with zero crossings respectively to reset said frequency dividing means by each of the second pulses to restart generation of the waveform;
  bistable means connected to said supplying means and resettable by said second pulses for producing an electrical signal of a first level in response to a zero crossing and, upon the occurrence of a transition in the waveform, producing a second level until a subsequent zero crossing occurs; and
  means for low-pass filtering the electrical signal from said bistable means to produce a frequency-dependent electrical reference for use by the regulating system.

17. A frequency sensing circuit as set forth in claim 16 wherein the AC output has a nominal frequency and the periodic waveform has a predetermined rolloff frequency less than the nominal frequency and selected so that the the waveform commencing means generates an unvarying voltage during the time between successive zero crossings of the AC output at the nominal frequency, and so that when the AC output frequency is less than the predetermined rolloff frequency the waveform makes a transition before the occurrence of a subsequent zero crossing.

18. A frequency sensing circuit as set forth in claim 16 wherein the first pulses have a repetition frequency selected so that when the AC output frequency is less than a predetermined rolloff frequency the waveform makes a transition in voltage level before said frequency dividing means is reset in response to a subsequent zero crossing, the rolloff frequency being substantially equal to the repetition frequency of the pulses divided by the value of frequency division of the frequency dividing means, the proportion of time during which the bistable means is producing the first level thereby decreasing linearly with frequency when the AC output frequency is less than the rolloff frequency, and said low-pass filtering means includes means for establishing a volts-per-Hertz slope of the electrical reference so that the electrical reference is zero at a lower limit frequency greater than zero and rises to a particular level at the rolloff frequency, which level remains substantially the same at frequencies above the rolloff frequency.

19. A method for sensing frequency over time of an input signal that has zero crossings, comprising the steps of:
  commencing generation of a periodic waveform in response to a zero crossing and restarting generation of the periodic waveform in response to a subsequent zero crossing, the generation of the periodic waveform continuing freely until each restarting occurs;
  producing a first electrical level in response to a zero crossing and, upon the occurrence of a predetermined change in the waveform, producing a second electrical level until a subsequent zero crossing occurs; and
  low-pass filtering the electrical levels to produce an output which is a function of the frequency of the input signal.

20. A frequency sensing circuit as set forth in claim 16 wherein said low-pass filtering means includes means for subtracting the low-pass filtered electrical levels from a predetermined voltage to produce the frequency-dependent electrical reference.

* * * * *